US008503580B2

United States Patent
Khayrallah

(10) Patent No.: US 8,503,580 B2
(45) Date of Patent: Aug. 6, 2013

(54) SOFT VALUE GENERATION USING SERIAL LOCALIZATION WITH INDECISION

(75) Inventor: Ali S. Khayrallah, Mountain View, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 359 days.

(21) Appl. No.: 12/912,927

(22) Filed: Oct. 27, 2010

(65) Prior Publication Data

US 2011/0051853 A1 Mar. 3, 2011

Related U.S. Application Data

(63) Continuation-in-part of application No. 12/549,132, filed on Aug. 27, 2009, now Pat. No. 8,306,102.

(51) Int. Cl.
*H04L 27/06* (2006.01)

(52) U.S. Cl.
USPC .......................................... 375/340; 375/229

(58) Field of Classification Search
USPC ................ 375/232, 229, 230, 350, 262, 340, 375/341, 320, 324
See application file for complete search history.

(56) References Cited

U.S. PATENT DOCUMENTS

| | | | |
|---|---|---|---|
| 2003/0063596 A1 | 4/2003 | Arslan et al. | |
| 2004/0052317 A1 | 3/2004 | Love et al. | |
| 2005/0243943 A1 | 11/2005 | Stirling-Gallacher | |
| 2006/0146950 A1* | 7/2006 | Hoo | 375/267 |
| 2006/0251181 A1 | 11/2006 | Shashidhar et al. | |
| 2007/0291882 A1* | 12/2007 | Park et al. | 375/347 |
| 2008/0198952 A1 | 8/2008 | Stirling-Gallacher | |
| 2008/0310556 A1 | 12/2008 | Lee et al. | |
| 2009/0323795 A1* | 12/2009 | Stirling-Gallacher | 375/232 |
| 2010/0142649 A1* | 6/2010 | Xie et al. | 375/320 |
| 2010/0150258 A1* | 6/2010 | van Zelst | 375/267 |
| 2012/0155579 A1* | 6/2012 | Zilberman et al. | 375/341 |

FOREIGN PATENT DOCUMENTS

EP 1 703 686 A1 9/2006

OTHER PUBLICATIONS

Qingmin Meng, Jingyu Hua, Xiaohu You, Xiangyang Zhuang, "Combined transmit antenna selection and detection over spatial correlated MIMO systems", Journal of Electronics (China), Nov. 2007.*

Gupta A. et al., "Multi-stage Detection Using Constellation Structure", University of Illinois at Urbana-Champaign, IEEE, Nov. 2006, the whole document.

(Continued)

*Primary Examiner* — Aristocratis Fotakis

(57) ABSTRACT

Soft bit values are generated for received symbols transmitted based on a modulation constellation by demodulating the received symbols via a sequence of demodulation stages, each demodulation stage producing a symbol decision based on an effective constellation. Each effective constellation used by a non-final one of the demodulation stages includes subsets of centroids approximating a region of the modulation constellation. Adjacent ones of the subsets have one or more common points so that at least two adjacent subsets overlap. The soft bit values for the symbol decisions are determined based on detection metrics computed during demodulation for the points included in the effective constellation constructed incrementally over the sequence of demodulation stages, the effective constellation produced by the final demodulation stage being devoid of one or more points included in the modulation constellation.

16 Claims, 12 Drawing Sheets

OTHER PUBLICATIONS

Meng Q. et al., "Transmit Antenna Selection in Spatial Correlated MIMO Systems with Correlation-Adapted Iterative Receiver", Southeast University, Nanjing, China and Motorola, 2006 IEEE, the whole document.

Li X. et al., "Reduced-complexity detection algorithms for systems using multi-element arrays", Lucent Technologies, Bell Labs, 2000 IEEE, the whole document.

* cited by examiner

| $\hat{s}$ | -3 | -1 | +1 | +3 |
|---|---|---|---|---|
| $b_1 b_0$ | 00 | 01 | 11 | 10 |
| $\bar{s}_1$ | +1 | +1 | -1 | -1 |
| $\bar{s}_0$ | -1 | -3 | +3 | +1 |

FIG. 11

| $\hat{s}[1]$ | -2 | | | 0 | | | +2 | |
|---|---|---|---|---|---|---|---|---|
| $Q_e$ | {-3,-1,0,+2} | | | {-2,-1,+1,+2} | | | {-2,0,+1,+3} | |
| $\hat{s}[2]$ | -1 | +1 | | -1 | +1 | | -1 | +1 |
| $\hat{s}$ | -3 | -1 | | -1 | +1 | | +1 | +3 |
| $b_1 b_0$ | 00 | 01 | | 01 | 11 | | 11 | 10 |
| $\tilde{s}_1$ | 0 | 0 | | +1 | -1 | | 0 | 0 |
| $\tilde{s}_0$ | -1 | -3 | | -2 | +2 | | +3 | +1 |

SOFT VALUE GENERATION USING SERIAL LOCALIZATION WITH INDECISION

CROSS-REFERENCE TO RELATED APPLICATION

This application is a continuation-in-part of U.S. patent application Ser. No. 12/549,132 filed 27 Aug. 2009, now U.S. Pat. No. 8,306,102 the content of which is incorporated herein by reference in its entirety.

TECHNICAL FIELD

The present invention generally relates to bit soft value generation, and more particularly relates to bit soft value generation based on serial localization with indecision.

BACKGROUND

Demodulation involves extracting an original information-bearing signal from a signal which is modulated in accordance with a particular constellation and transmitted over a channel. The complexity of the demodulation process increases significantly for very large signal constellations. Relatively large signal constellations such as 16-, 32- and 64-QAM (Quadrature Amplitude Modulation) have been adopted in EDGE (Enhanced Data Rates for GSM Evolution), HSPA (High Speed Packet Access), LTE (Long Term Evolution) and WiMax (Worldwide Interoperability for Microwave Access). In HSPA, multi-code transmission creates even larger effective constellations. Also, MIMO (Multiple-Input, Multiple-Output) schemes with two or more streams have been adopted in HSPA, LTE and WiMax. MIMO implementations also yield relatively large effective constellations. Demodulation complexity further increases when any of these techniques occur in combination, e.g. multi-code and MIMO.

The ideal demodulation scheme is MLD (Maximum Likelihood Detection). However, the complexity of MLD increases substantially due to the size of the modulation constellation and/or because of the exponential effects of MIMO or multi-codes to the point where MLD becomes impractical. Less complex solutions are available such as sphere decoding (SD), where the demodulator tries to approximate the performance of MLD, but limits its search for the best solution to a subset of all possible transmitted signals, and where the subset is described by a sphere. A key step in SD is the triangular factorization of the channel matrix. This step simplifies the identification of candidate solutions in the sphere.

Another conventional demodulation technique is ITS (Iterative Tree Search) detection for MIMO QAM. ITS can be viewed as an alternative to SD. Like SD, ITS exploits the triangular factorization of the channel. Unlike SD, ITS uses the M-algorithm for reducing the search for the best candidate. ITS breaks down the search further, by dividing the QAM constellation in its four quadrants, and representing each quadrant by its centroid in intermediate computations. The selected quadrant itself is subdivided again into its 4 quadrants, and so on. This results in a quaternary tree search. Other conventional approaches give particular attention to the additional error introduced by the use of the centroids instead of true symbols. The error is modeled as Gaussian noise whose variance is determined and incorporated in likelihood computations. However, a tight connection is typically made between the centroid representation and the bit mapping from bits to symbols. That is, if a so-called multi-level bit mapping is employed, then identifying a quadrant is equivalent to making a decision on a certain pair of bits. Such constraints place a restriction on bit mappings, restricting the design of subsets.

Soft bit information is generated based on the demodulation results. Joint detection (JD) is the MLD form in the MIMO scenario, and is often used in generation of soft bit information. JD searches over all $q^M$ effective constellation points for an M×1 vector c of transmitted symbols corresponding to M transmitted streams for the candidate that minimizes the metric $m(c)=(r-Hc)^H R^{-1}(r-Hc)$. There are several ways to produce soft values for JD. One conventional approach is based on the concept of nearest neighbors.

A nearest neighbor (NN) is a symbol at the smallest distance from a given symbol. From the perspective of JD, the NNs in principle should be in the "receive domain". That is, the metric m(c) given above is used, to include the effect of the channel. The distance between two symbol vectors c and d is then given by $(Hc-Hd)^H R^{-1}(Hc-Hd)$ where H is an N×M channel coefficient matrix where the columns correspond to the M transmitted streams and R is a noise covariance matrix. Finding NNs in the receive domain is a highly complex operation because the channel effectively distorts the signal constellation, making it difficult to search. Also, since H and R change with time, the operation must be repeated.

Another approach involves finding the NNs in the "transmit domain", where the constellation is un-distorted by the channel and easily searchable, allowing many factors to be pre-computed. The standard Euclidean distance is also used. Specifically, the effect of the channel is ignored and the neighbors in the original constellation are considered. Furthermore, the NNs of the M individual symbols of a symbol vector can be examined. Altogether, this simplifies the search for NNs. However, some valuable information is lost by ignoring the effect of channel. Also, an NN in the transmit domain is not necessarily an NN in the receive domain.

From the concept of NN arises the concept of bit nearest neighbor (BNN). Without much loss of generality, a constellation with $2^J$ symbols is considered. Let $b_{J-1} \Lambda b_0$ denote the J bits mapping into symbol ĉ at position k in the symbol vector ĉ. For bit $b_j$, the BNN $\bar{c}_j$ is defined as the closest symbol in the constellation with $b_j$ flipped. If multiple symbols satisfy the BNN requirement, one is selected so that the BNN is unique. No conditions are imposed on the remaining J−1 bits, which may or may not change. The BNNs can be computed off-line, from the constellation and the bit map.

Given a soft value solution ĉ out of JD, a symbol vector $\bar{c}$ is constructed for bit $b_j$ where the k-th symbol ĉ is replaced by its BNN $\bar{c}_j$. The other symbols are left unchanged. The soft value for bit $b_j$ in symbol $c_i$ is given by $\beta_j = m(\hat{c}) - m(\bar{c})$ where $\bar{c}$ is commonly referred to as the BNN vector. There is a need to adapt the concept of NNs and BNNs to receiver architectures that employ serial localization with indecision which represents transmitted symbols as a series of approximations.

SUMMARY

Demodulation is performed in a series of stages. Each stage attempts to further localize the search for a solution for the benefit of the next stage, based on input from the previous stage. The demodulator structure is referred to herein as serial localization with indecision (SLIC). SLIC is a lower complexity alternative to MLD, where MLD coincides with joint demodulation (JD) for MIMO environments. Viewed in isolation, a given SLIC demodulation stage can be quite indecisive, but makes progress and avoids an irreversible wrong decision. A given demodulation stage localizes the solution by inputting a subset representative of the constellation and outputting a further reduced subset. Each stage makes a choice among candidate reduced subsets. Indecision arises from representing the modulation constellation with overlapping subsets. Indecision is beneficial in a multi-stage structure, because indecision discourages an irreversible bad decision in an early stage.

The bit nearest neighbor (BNN) concept is adapted to SLIC to account for the centroids used in SLIC. This leads the concept of an effective constellation, which approximates the true constellation with a variable granularity, guided by the stage decisions of SLIC. This enables effective BNNs (EBNN) to be defined, which are used in soft value computations.

According to an embodiment, soft bit values are generated for received symbols transmitted based on a modulation constellation by demodulating the received symbols via a sequence of demodulation stages. Each demodulation stage produces a symbol decision based on an effective constellation. Each effective constellation used by a non-final one of the demodulation stages includes subsets of centroids approximating a region of the modulation constellation. Adjacent ones of the subsets have one or more common points so that at least two adjacent subsets overlap. The soft bit values for the symbol decisions are determined based on detection metrics computed during demodulation for the points included in the effective constellation constructed incrementally over the sequence of demodulation stages, the effective constellation produced by the final demodulation stage being devoid of one or more points included in the modulation constellation.

Of course, the present invention is not limited to the above features and advantages. Those skilled in the art will recognize additional features and advantages upon reading the following detailed description, and upon viewing the accompanying drawings.

BRIEF DESCRIPTION OF THE DRAWINGS

FIG. 11 shows the bits mapping into each symbol of the modulation example shown in FIG. 10, and the corresponding bit nearest neighbors for each symbol.

FIG. 12 shows different possible effective constellations for various stages of a SLIC demodulator and the corresponding effective bit nearest neighbors.

DETAILED DESCRIPTION

Figure 1:
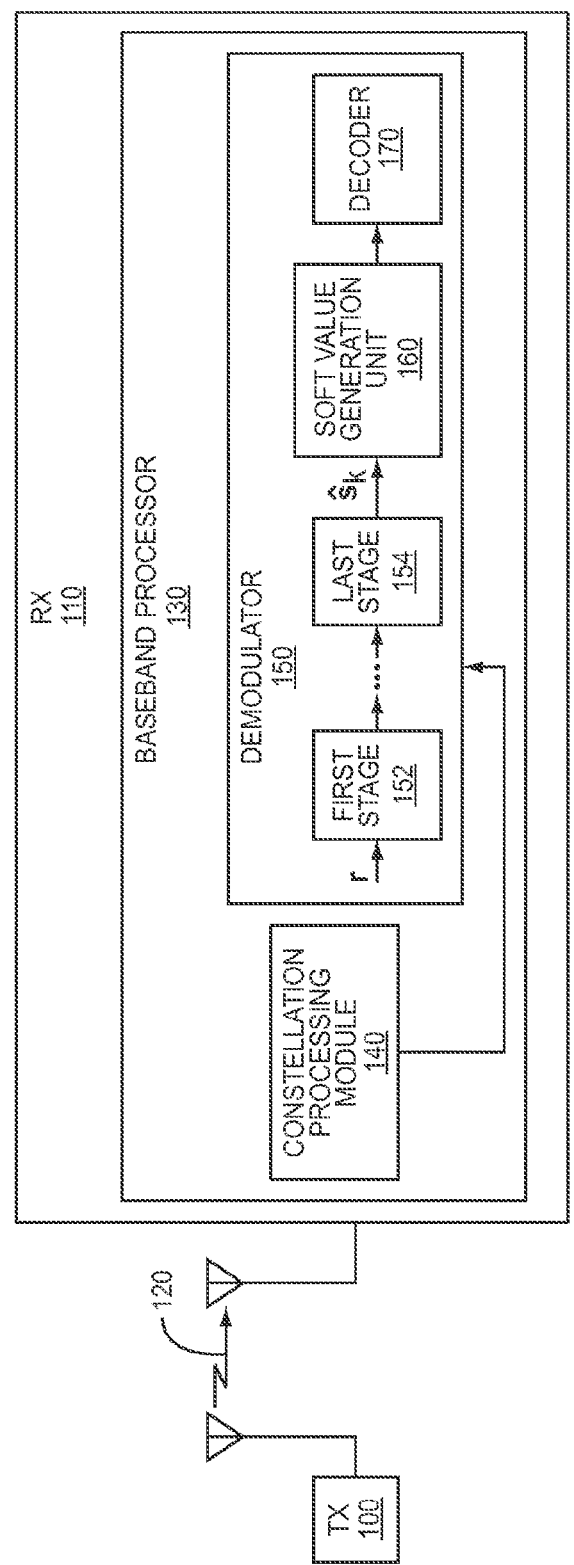
FIG. 1 illustrates a block diagram of an embodiment of a receiver including a multi-stage SLIC demodulator and a constellation processing module.

FIG. 1 illustrates an embodiment of a wireless transmitter 100 in communication with a wireless receiver 110 over a channel 120. The receiver includes a baseband processor 130 with a constellation processing module 140, multi-stage SLIC demodulator 150, soft value generation unit 160 and a decoder 170 included in or associated with the baseband processor 130. The constellation processing module 140 groups points of a constellation associated with a transmitted signal into a plurality of subsets, e.g., subsets of ASK constellation points, QAM constellation points, etc. At least two adjacent subsets have one or more common constellation points to ensure that these adjacent subsets overlap. In some embodiments, all adjacent subsets have one or more common constellation points to ensure that all adjacent subsets overlap. In each case, the constellation processing module 140 also determines a centroid-based value for each of the subsets of constellation points and groups the centroid-based values into one or more sets. The values included in each set are centroid-based in that they may be actual centroids, approximations of centroids such as integer values or values quantized to a certain finite precision, the closest constellation point to a centroid, etc. More generally, each subset is assigned a centroid-based representative, which we call a centroid from here on.

The multi-stage SLIC demodulator 150 includes a plurality of stages 152, 154 for performing signal demodulation in stages. Each of the demodulation stages 152 except for the last stage 154 localizes the search for a final symbol decision using the set of centroid-based values input to or selected by the stage 152 as constellation points. The last demodulation stage 154 determines the final symbol decision using a subset of the initial constellation points. This way, each of the demodulation stages 152 except for the last stage 154 further localizes the search for a solution using a set of the centroid-based values as constellation points, reducing the overall complexity of the demodulator. The last stage 154 outputs the final solution based on a subset of the actual constellation. The constellation processing module 140 ensures that at least two adjacent subsets of constellation points overlap to reduce the likelihood of demodulation errors, particularly for the earlier demodulation stages as will be described in more detail later herein. The soft value generation unit 160 determines soft bit values for the symbol decisions generated by the demodulator based on detection metrics computed during demodulation for the points included in the effective constellation constructed incrementally over the sequence of demodulation stages as will be described in more detail later herein, with the final effective constellation being produced by the final stage of the demodulator. The decoder 170 processes the soft values produced by the soft value generation unit 160 for modem bits. The decoder 170 uses the soft values as an input to determine the information bits, and is the companion function at the receiver for the encoder at the transmitter.

Figure 2:
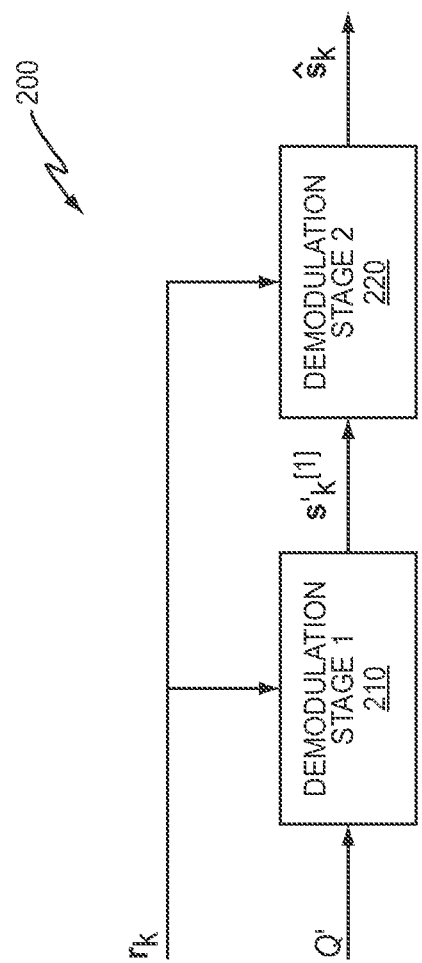
FIG. 2 illustrates a block diagram of an embodiment of a two-stage SLIC demodulator.

FIG. 2 illustrates an embodiment of a 2-stage SLIC demodulation structure 200 included in the receiver 110 of FIG. 1 for demodulating a received signal $r_k$. The received signal $r_k$ is carried over the channel 120 and originally modulated at the transmitter 100 using symbol constellation Q. For purely illustrative purposes only, signal $r_k$ in a single input single output (SISO) scenario of a signal transmission embodiment over a noisy channel with no ISI (Inter-Symbol Interference) is given by:

$$r_k = H_0 s_k + v_k \quad (1)$$

where $v_k$ represents white Gaussian noise, $H_0$ represents the channel 120, $s_k$ represents the transmitted symbols and all quantities are scalar. One skilled in the art can readily expand the signal model represented by equation (1) to other scenarios such as MIMO and multi-coded transmission, where the quantities in equation (1) become vectors and matrices. The originally transmitted signal has symbol constellation Q of size q. The constellation processing module 140 of the receiver 110 groups the points of constellation Q into a plurality of subsets in a way that ensures at least two adjacent subsets overlap. The constellation processing module 140 also determines a centroid-based value for each of the subsets of constellation points and generates an alternative constellation Q' including the centroid-based values, not necessarily belonging to Q, for input to a first stage 210 of the 2-stage SLIC demodulation structure 200.

The first stage 210 of the SLIC structure 200 performs demodulation using the alternative constellation Q'. That is, the first demodulation stage 210 uses the centroid-based values included in Q' as constellation points. Each point in Q' represents a subset of clustered points in Q. In one embodiment, each centroid-based value included in Q' is the actual centroid for the points of a particular subset of Q. In another embodiment, the centroids are approximated as integer values. In yet another embodiment, each centroid-based value included in Q' is the constellation point of Q located closest to the corresponding centroid value. Still other types of values may be used which are derived based on the centroids determined from the different subsets of Q.

The first demodulation stage 210 outputs a symbol decision $s'^{[1]}_k$, which belongs to Q'. The second demodulation stage 220 accepts $s'^{[1]}_k$ and uses $s'^{[1]}_k$ to choose a localized subset Q" of Q as its own constellation. The decision $s'^{[1]}_k$ output by the first demodulation stage 210 can be interpreted to be the representative of Q" in the first demodulation stage 210. The second demodulation stage 220 outputs the final symbol decision $\hat{s}_k$, which belongs to Q". The final symbol decision $\hat{s}_k$ output by the second stage 220 is determined based on the original received signal $r_k$ and subset Q", which is selected based on the localized symbol decision $s'^{[1]}_k$ output by the first stage 210. In one embodiment, both demodulation stages 210, 220 implement MLD over their respective alphabets. Alternatively, the demodulation stages 210, 220 implement other types of demodulation schemes such as joint detection, sphere decoding, tree searching, etc. The 2-stage SLIC demodulation structure 200 makes q'=|Q'| comparisons in the first stage 210 and q"=|Q"| comparisons in the second stage 220. Complexity of the SLIC structure 200 is reduced when q'+q"<q. Also, SLIC has constant complexity, unlike many suboptimal techniques whose complexity is a random variable.

SLIC can mimic the behavior of MLD. The performance of the 2-stage SLIC structure 200 of FIG. 2 is primarily limited by that of the first demodulation stage 210, which in turn is determined by the choice of subsets. Performance suffers when no adjacent subsets overlap. Consider the case of disjoint subsets. MLD implicitly defines a decision region (Voronoi region) around each constellation point, consisting of received values closest to that point than any other. The decision region boundaries are polyhedrons (made up of sections of hyperplanes). Two constellation points x and y are neighbors if their decision regions touch. The common part is a section of the hyperplane P(x,y) that bisects the space according to x and y. In degenerate cases, the common part can become a line or a point. Now consider two adjacent subsets X and Y of Q which are available to the first demodulator stage 210 of the two-stage SLIC structure 200. Subsets X and Y have centroids c(X) and c(Y), respectively. Consider neighbor pair (x,y), where x belongs to X and y belongs to Y. Suppose x is transmitted, and the first demodulation stage 210 makes an error and chooses subset Y instead of subset X. The effective decision boundary of the first demodulation stage 210 is the hyperplane P(c(X),c(Y)). In contrast, MLD would make the choice based on P(x,y). For the sake of comparison, MLD can be thought of as making an effective decision between X and Y. Then the effective decision boundary is made up of the sections P(x,y) of different nearest neighbor pairs (x,y).

Figure 3:
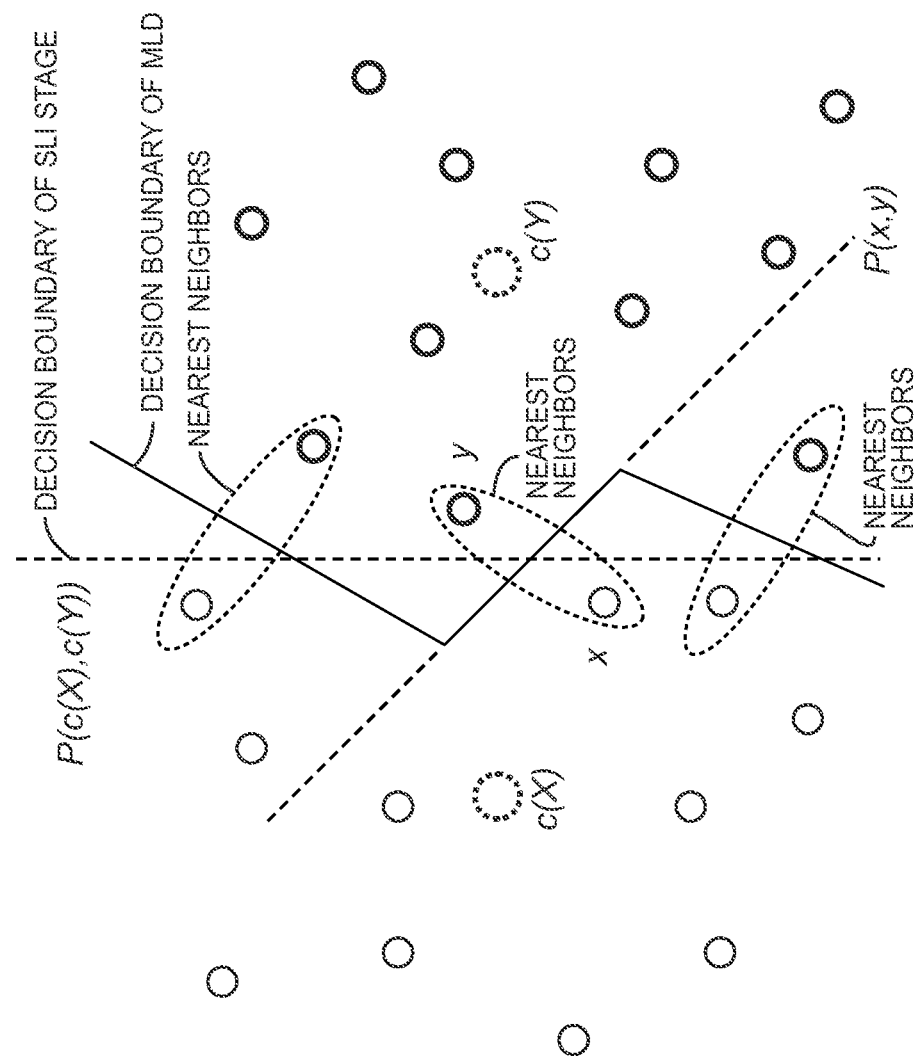
FIG. 3 illustrates a diagram of an embodiment of overlapping constellation subsets for use by a multi-stage SLIC demodulator.

FIG. 3 illustrates the effective decision boundary between adjacent subsets X and Y in two dimensions, where the hyperplane becomes a straight line and each constellation point is represented by a circle. In contrast, the decision boundary for MLD is a piecewise straight jagged line. The discrepancy between these hypothetical decision boundaries leads to a performance loss in SLIC.

Overlapping two or more adjacent subsets smoothes the decision boundary discrepancy. In particular, in the two stage SLIC, including nearest neighbor symbols pairs in the overlap of adjacent subsets of the first demodulation stage means that the first demodulation stage does not have to make a decision about those symbols. That decision will be made in the second stage.

With SLIC, the search is further localized from one stage to the next, but the final decision is not made until the last stage. In particular, by making nearest neighbor symbols belong to multiple subsets, a later demodulation stage (e.g. the second stage 220 in FIG. 2) may recover from an error in an earlier stage (e.g. the first stage 210 in FIG. 2). In this context, indecision is beneficial. However, ensuring adjacent subsets overlap has a cost. In terms of complexity, q' or q", or both, will increase for the overlap case in comparison to the disjoint case.

Figure 4:
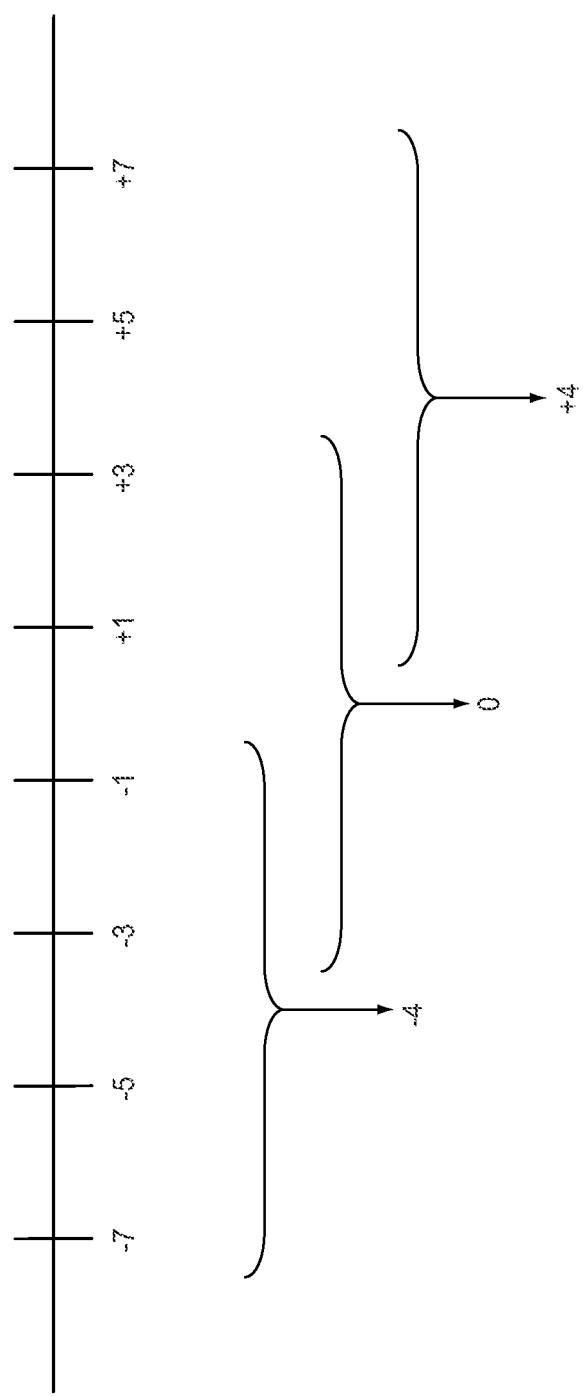
FIG. 4 illustrates a diagram of an embodiment of overlapping ASK constellation subsets for use by a multi-stage SLIC demodulator.

FIG. 4 illustrates an exemplary embodiment of an 8-ASK constellation grouped into three subsets. The 8-ASK constellation is given by:

$$Q = \{-7, -5, -3, -1, +1, +3, +5, +7\} \quad (2)$$

The three overlapping subsets shown in FIG. 4 have centroids given by:

$$Q' = \{-4, 0, +4\} \quad (3)$$

The overlap means that the second demodulation stage 220 of the SLIC structure 200 of FIG. 2 can often recover from a bad decision by the first demodulation stage 210. The two outer subsets shown in FIG. 4 are offsets of one another, and the offset is equal to the centroid difference. SLIC complexity can be further reduced by accounting for the highly structured nature of these subsets. Of course, less structured subsets can also be used with SLIC.

Figure 5:
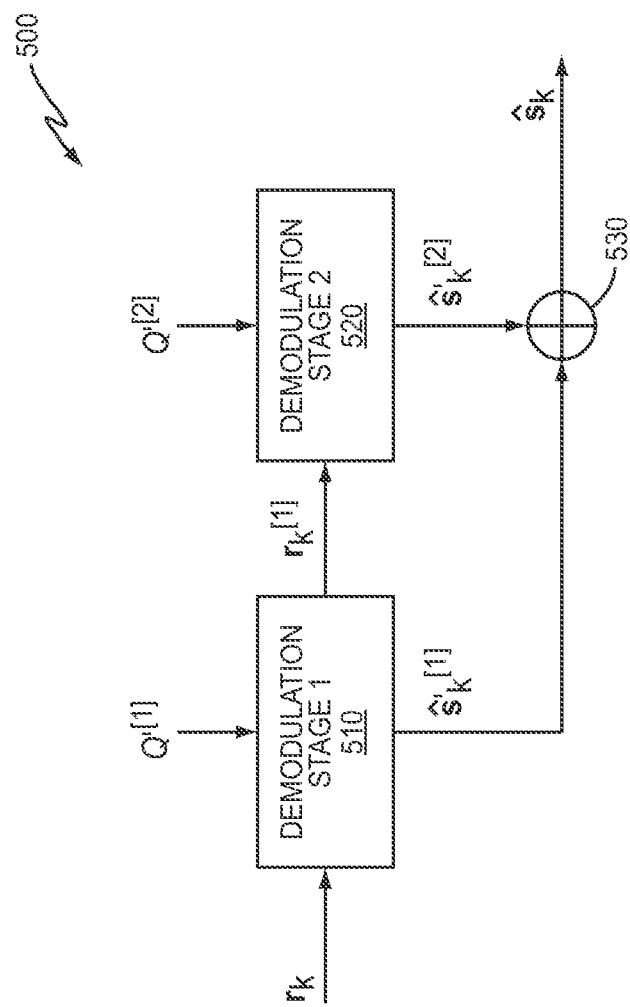
FIG. 5 illustrates a block diagram of another embodiment of a two-stage SLIC demodulator.

FIG. 5 illustrates another embodiment of a 2-stage SLIC demodulation structure 500 for demodulating signal $r_k$. The 2-stage SLIC structure 500 shown in FIG. 5 is similar to the one shown in FIG. 2, except it is tailored to the highly structured nature of the ASK constellation subsets shown in FIG. 4. The constellation input to or selected by the first demodulation stage 510 is the set of centroids denoted $Q'^{[1]}$. The first modulation stage 510 outputs a decision $\hat{s}'^{[1]}_k$ which is the centroid-based value included in $Q'^{[1]}$ that most closely corresponds to the signal $r_k$. The first demodulation stage 510 also generates a re-modulated signal $\hat{r}'_k{}^{[1]}$ as a function of $\hat{s}'_k{}^{[1]}$ and the channel 120 over which the signal is carried as given by:

$$\hat{r}'_k{}^{[1]} = H_0 \hat{s}'_k{}^{[1]} \quad (4)$$

where $H_0$ represents the channel 120.

The first demodulation stage 510 removes the re-modulated signal from $\hat{r}'_k{}^{[1]}$ to generate a modified signal $r_k{}^{[1]}$ for input to the second stage 520 as given by:

$$r_k{}^{[1]} = r_k - \hat{r}'_k{}^{[1]} \quad (5)$$

The modified signal $r_k{}^{[1]}$ is then fed to the second demodulation stage 520 instead of the original signal $r_k$. The second demodulation stage 520 determines the final symbol decision $\hat{s}_k$ by demodulating $r_k{}^{[1]}$ output by the first stage 510 using subset $q'^{[2]}$ of constellation points input to or selected by the last stage 520 to generate a localized symbol decision $\hat{s}'_k{}^{[2]}$ associated with the second stage 520. A summer 530 included in or associated with the second demodulation stage 520 sums $\hat{s}'_k{}^{[1]}$ and $\hat{s}'_k{}^{[2]}$ to generate the final symbol decision $\hat{s}_k$ as given by:

$$\hat{s}_k = \hat{s}'_k{}^{[1]} + \hat{s}'_k{}^{[2]} \quad (6)$$

To account for change to the input of the second demodulation stage 520, constellation $Q'^{[2]}$ is the subset of Q centered so its centroid is equal to 0. With regard to the subset embodiment shown in FIG. 4, $Q'^{[2]}$ is the middle subset. The decision $s'_k{}^{[2]}$ output by the second demodulation stage 520 is an element of $Q'^{[2]}$. Considering again an exemplary 8-ASK constellation embodiment, $Q'^{[1]} = \{-4, 0, +4\}$ and $Q'^{[2]} = \{-3, -1, +1, +3\}$. The second subset $Q'^{[2]}$ corresponds to the 4-ASK constellation. This SLIC embodiment is referred to herein as SL34. The corresponding number of comparisons is 3 and 4, for a total of 7 compared to 8 for MLD. The computational efficiency SLIC has over MLD increases substantially for MIMO and multi-code transmission scenarios.

An L×L MIMO embodiment is described next, where a plurality of signal components are transmitted from multiple antennas and received from multiple antennas. The number of transmit and receive antennas are both assumed to be equal to L. Those skilled in the art will recognize that the number of receive antennas may in fact be smaller or larger than the number of transmit antennas. Now $r_k$, $s_k$ and $v_k$ in equation (1) are L×1 vectors and $H_0$ is an L×L matrix. For ease of explanation only and without much loss of generality, the same constellation is presumed to be used for all L transmitted signals. However, those skilled in the art will recognize that the embodiments described next can be readily expanded to cover the scenario where some or all of the L transmitted signals have different constellations. The effective constellation at the receiver has points given by $H_0 \hat{s}_k$ and size q. Unlike the SISO case, where the channel 120 applied a trivial scaling and rotation to the constellation, here the effective constellation gets distorted by $H_0$. In principle, overlapping subsets can be designed for the effective constellation. However, the effective constellation changes with the channel 120, and thus so would the design of the overlapping subsets. In another embodiment, the subsets can be designed on a signal component basis. According to this embodiment, the discrepancy between the MLD and SLIC decision boundaries can be big enough to affect performance of the SLIC when the effective constellation is distorted significantly. However, this embodiment still proves to be very resilient.

Again turning to the exemplary 8-ASK constellation, the 8-ASK constellation is applied to 2×2 MIMO in an embodiment, where each signal component constellation is 8-ASK. For the 2-stage SLIC structure 500 shown in FIG. 5, the three overlapping subsets shown in FIG. 4 are used for each signal component constellation. According to the SL34 embodiment, the first demodulation stage 510 compares 3×3=9 candidates and the second demodulation stage 520 compares 4×4=16 candidates, for an SLIC total of 25. In contrast, MLD compares 8×8=64 candidates. In an alternate embodiment, the set of centroid-based values input to the first demodulation stage 510 includes four values and is given by $Q'^{[1]} = \{-5, -1, +1, +5\}$. The subset points input to the second demodulation stage 520 includes three ASK localized constellation points given by $Q'^{[2]} = \{-2, 0, +2\}$. This SLIC embodiment is referred to herein as SL43. In yet another embodiment referred to herein as SL25, $Q'^{[1]} = \{-3, +3\}$ and $Q'^{[2]} = \{-4, -2, 0, +2, +4\}$. In each case, the subsets overlap to reduce the likelihood of errors caused by the 2-stage SLIC structures described herein. The 2-stage SLIC embodiments described herein can be readily extended to any number of desired stages.

Figure 6:
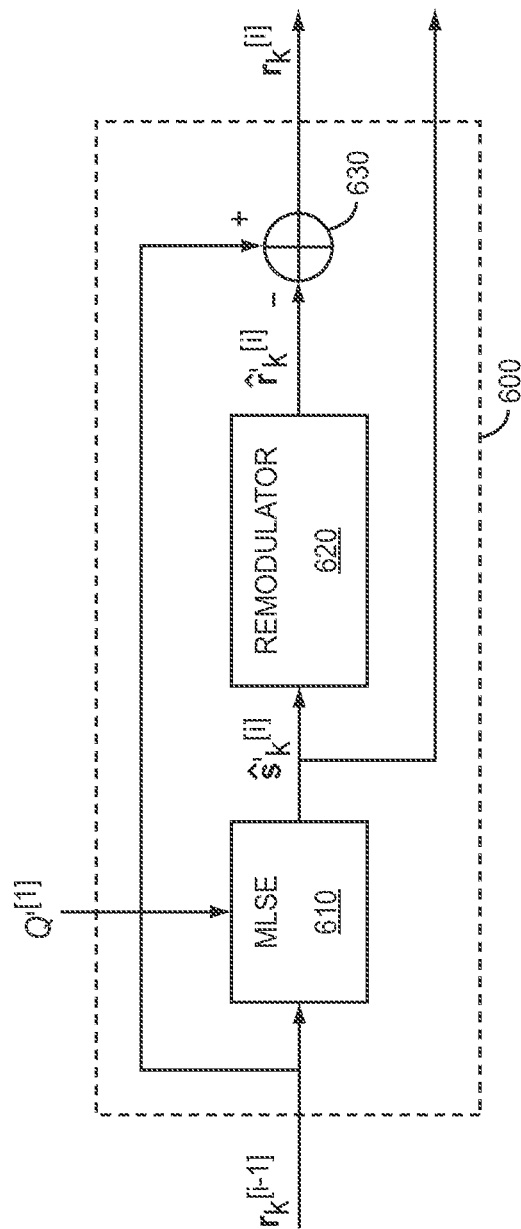
FIG. 6 illustrates a block diagram of an embodiment of an i-th stage of a multi-stage SLIC demodulator.

FIG. 6 illustrates an embodiment of the i-th stage 600 of an SLIC demodulator structure where i<N. The input to the i-th demodulation stage 600 is the modified received signal $r_k{}^{[i-1]}$ output by the immediately preceding stage (not shown in FIG. 6). The constellation $Q'^{[i]}$ input to the i-th stage 600 includes a set of centroid-based values determined as previously described herein. A MLD component 610 of the i-th stage 600 outputs symbols $\hat{s}'_k{}^{[i]}$ based on $Q'^{[i]}$ and $r_k{}^{[i-1]}$. A re-modulator component 620 of the i-th stage 600 generates a re-modulated signal $\hat{r}'_k{}^{[i]} = H_0 \hat{s}'_k{}^{[i]}$. A signal subtractor component 630 of the i-th stage 600 subtracts from $\hat{r}'_k{}^{[1]}$ from $r_k{}^{[i-1]}$ to yield a modified received signal $r_k{}^{[i]}$, which is fed to the next stage (not shown in FIG. 6).

Figure 7:
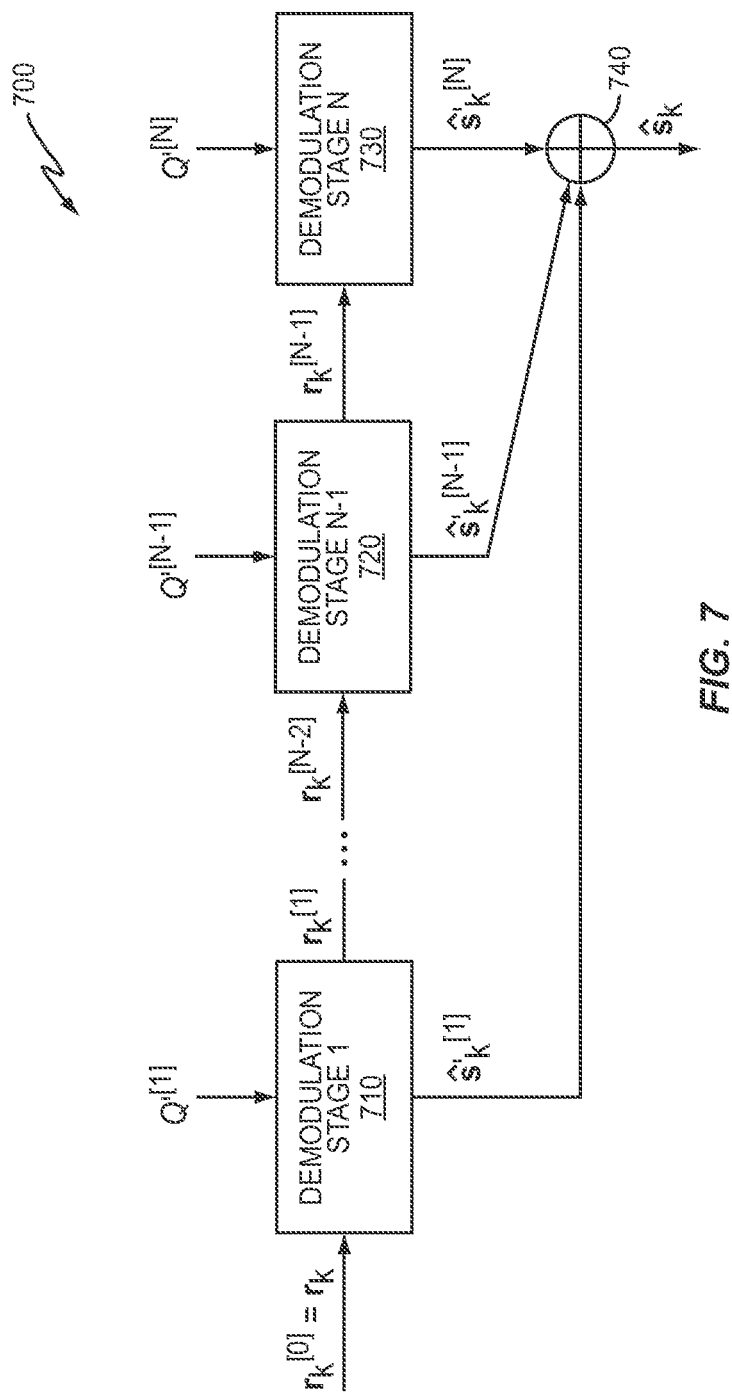
FIG. 7 illustrates a block diagram of an embodiment of an N-stage SLIC demodulator.

FIG. 7 illustrates an embodiment of an N-stage SLIC demodulation structure 700. The input to the first stage 710 is the original received signal $r_k{}^{[0]} = r_k$. For the last stage 730, the constellation $Q'^{[N]}$ is a subset of Q. There is no need for re-modulation block in the last stage 730. A summer component 740 included in or associated with the last stage 730 determines the overall final symbol decision by adding all intermediary symbol decisions as given by:

$$\hat{s}_k = \hat{s}'_k{}^{[1]} + \Lambda + \hat{s}'_k{}^{[N]} \quad (7)$$

In one embodiment, each intermediary stage 720 of the N-stage SLIC demodulator 700 has the same structure as the i-th demodulation stage 600 shown in FIG. 6. According to this embodiment, the i-th intermediary stage 720 localizes the search for the final symbol decision $\hat{s}_k$ by demodulating a modified version of the received signal $r_k{}^{[i-1]}$ output by the immediately preceding stage using the set of centroid-based values $Q'^{[i]}$ input to or selected by the i-th intermediary stage 720 and outputting a localized symbol decision $\hat{s}'_k{}^{[i]}$ as described previously herein.

The i-th intermediary stage 720 also generates a re-modulated signal $\hat{r}'_k{}^{[i]}$ as a function of the channel 120 and the localized symbol decision generated by the stage 720. The re-modulated signal $\hat{r}'_k{}^{[i]}$ is removed from the modified version of the received signal $r_k{}^{[i-1]}$ output by the immediately preceding stage, e.g. as shown in FIG. 6, to generate a newly modified version of the received signal $r_k{}^{[i]}$ for input to the stage immediately following the i-th intermediary stage 720. Subtracting $\hat{r}'_k{}^{[i]}$ removes part of the transmitted signal, which acts as self-interference. This enables later stages to operate with less self-interference. The constellation $Q'^{[i]}$ input to or selected by each of the i intermediary stages 720 includes centroid-based values, which may or may not belong to Q, whereas the constellation $Q'^{[N]}$ input to or selected by the last stage 730 is a subset of Q. As such, the last stage 730 of the N-stage SLIC demodulation structure 700 functions as an MLD on what is left from the original signal in $r_k^{[N-1]}$.

Broadly, there is no restriction on how the overlapping subsets used for SLIC are defined. Subset size can vary, the number of available subsets can change from stage to stage, etc. For the case of ASK, overlapping subsets can be defined in a way that yields a nested structure and a three subset representation. Consider the general case of $2^L$ASK, having the constellation given by:

$$Q = \{-2^L+1, \Lambda, -1, +1, \Lambda, +2^L-1\} \qquad (8)$$

Three overlapping subsets are defined, where the first subset contains the $2^{L-1}$ negative points. The second includes the $2^{L-1}$ middle points $\{-2^{L-1}+1, \Lambda, +2^{L-1}-1\}$, corresponding to $2^{L-1}$ASK. The third subset includes the $2^{L-1}$ positive points. The centroids for each of the three subsets are $-2^{L-1}$, 0 and $+2^{L-1}$, respectively. The same technique can be used to generate three overlapping subsets for $2^{L-1}$ASK, and so on. An N-stage SLIC demodulation structure can then be designed using these subsets with $N \leq L$. Except for the last stage of the N-stage SLIC demodulator, the set of centroids input to or selected by the i-th stage is given by:

$$Q^{[i]} = \{-2^{n-i}, 0, +2^{N-i}\} \qquad (9)$$

The last stage of the N-stage SLIC demodulator has the constellation of $2^{L-N+1}$ASK. In particular, for $N=L-1$, $Q'^{[N]} = \{-3, -1, +1, +3\}$. If the maximum number of stages $N=L$ is used, then $Q'^{[N]} = \{-1, +1\}$. Again considering 8ASK, the SL34 structure satisfies the nested subset design. Alternatively, a 3-stage SLIC demodulator structure with the nested subset design can also be employed where the first and second demodulator stages each compares 9 candidates, and the third (last) demodulator stage compares 4 candidates, for a total of 21, which is slightly less than 25 for the SL34 structure.

The SLIC embodiments described herein can be readily adapted to other modulation schemes such as QAM. The extension of SLIC from ASK to QAM is straightforward. Again, in principle, there is no restriction on how the overlapping subsets are defined. In one embodiment, the nested subset design of $2^L$-ASK can be generalized to $2^{2L}$-QAM. Just as QAM can be viewed as taking the product of two ASK constellations to produce the complex QAM constellation, the product of the ASK subsets can be taken to produce the subsets of QAM.

Figure 8:
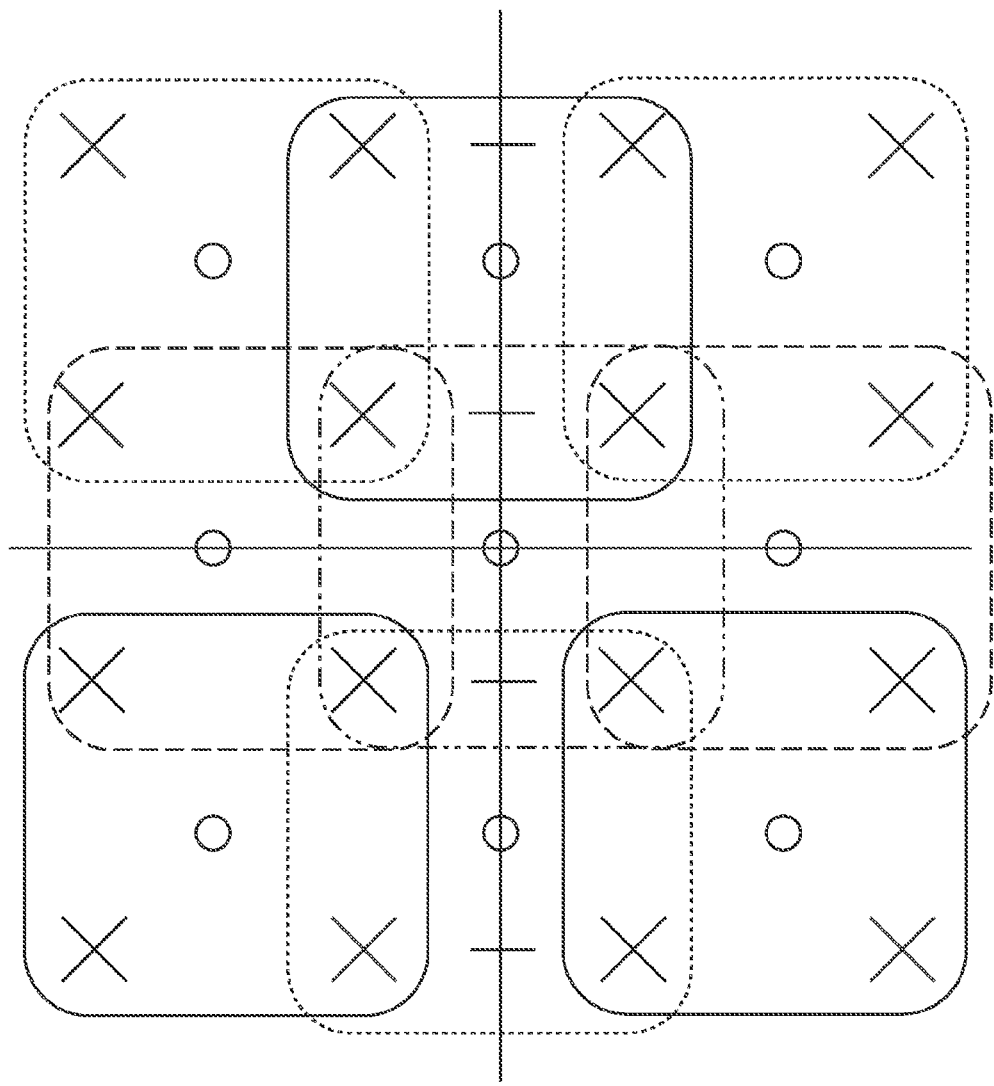
FIG. 8 illustrates a diagram of an embodiment of overlapping QAM constellation subsets for use by a multi-stage SLIC demodulator.

FIG. 8 illustrates an embodiment of generalizing ASK to 16-QAM. Each QAM constellation point shown in FIG. 8 is represented by an 'X'. The three subsets for ASK, e.g. as shown in FIG. 4, yield nine subsets for 16-QAM as illustrated by the boxes drawn around the different groups of constellation points in FIG. 8. At least two adjacent subsets have overlapping constellation points. The middle subset coincides with 4-QAM, or QPSK (Quadrature Phase-Shift Keying). The nine centroid values for 16-QAM, which are shown as circles in FIG. 8, are also determined from the respective three centroid values for ASK. ASK can be further generalized to 64-QAM. For the SL34 embodiment and 64-QAM, the first demodulation stage compares 9×9=81 candidates and the second demodulator stage compares 16×16=256 candidates, for a total of 337. In contrast, MLD compares 64×64=4096 candidates for 64-QAM. Thus, the reduced-complexity advantage of SLIC becomes more pronounced as the constellation grows.

Figure 9:
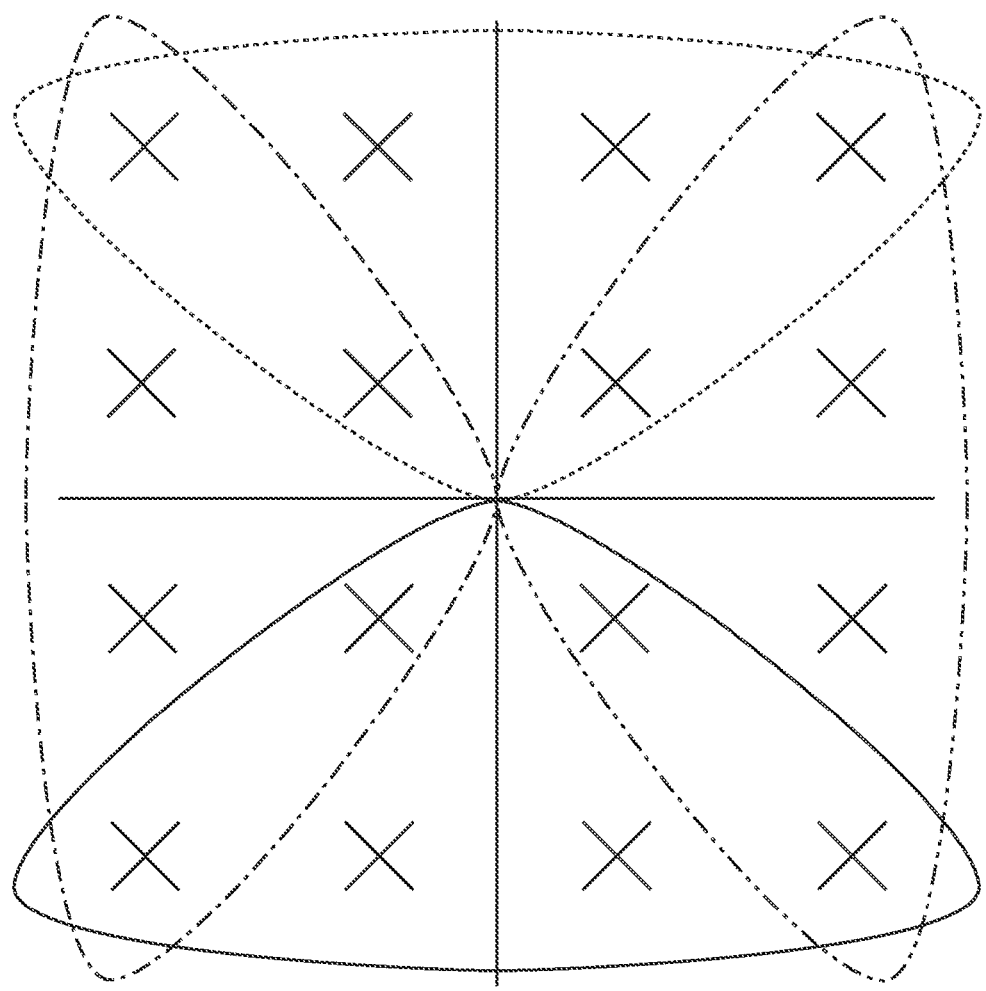
FIG. 9 illustrates a diagram of another embodiment of overlapping QAM constellation subsets for use by a multi-stage SLIC demodulator.

The design of overlapping subsets need not be based on the component ASK constellation. FIG. 9 illustrates an embodiment of the 16-QAM constellation where each of the subsets is directly determined from the QAM constellation and not derived from ASK. Each QAM constellation point shown in FIG. 9 is represented by an 'X' and the subsets are shown as boxes drawn around different groups of constellation points. Again, at least two adjacent subsets have overlapping constellation points. Each of the SLIC embodiments described herein, including subset selection, yield a low complexity alternative to MLD with good performance. SLIC provides a distinct complexity advantage as the effective modulation constellation grows, such as in MIMO and multi-code scenarios.

The soft value generation unit 160 included in the receiver 110 can implement joint detection (JD) in the MIMO scenario to generate soft bit information. Conventional JD operates on the product constellation $Q^M$, and SLIC stage i operates on the product constellations $(Q^{[i]})^M$ as previously described herein. The SLIC process produces an effective constellation (EC), denoted $Q_e$, which can be viewed as an approximation of $Q^M$, with a variable granularity, guided by the SLIC stage decisions $\hat{s}'_k{}^{[1]}$, $\hat{s}_k{}^{[2]}$ etc. e.g. as shown in FIG. 7. The finer granularity corresponds to the region where SLIC progressively focuses its search, as previously explained above.

The effective constellation $Q_e$ is constructed demodulation stage by demodulation stage. Prior to the first demodulation stage 152, $Q_e$ consists of $(Q^{[1]})^M$. A symbol vector $\hat{s}'_k{}^{[1]}$ from $(Q^{[1]})^M$ is the decision of the first demodulation stage 152. Before the second demodulation stage, $\hat{s}'_k{}^{[1]}$ is removed from $Q_e$, and replaced with the set:

$$\hat{s}'_k{}^{[1]} \Gamma(Q^{[2]})^M = \{\hat{s}'_k{}^{[1]} + a, \, a \in (Q^{[2]})^M\} \qquad (10)$$

Compared to $\hat{s}'_k{}^{[1]}$, the elements of $\hat{s}'_k{}^{[1]} \Gamma(Q^{[2]})^M$ can be viewed as better approximations to the elements of $Q^M$ in the region of $\hat{s}'_k{}^{[1]}$.

Similarly for the second demodulation stage, symbol $\hat{s}'_k{}^{[2]}$ from $(Q^{[2]})^M$ is the decision of the second demodulation stage. By construction, $(\hat{s}'_k{}^{[1]} + \hat{s}'_k{}^{[2]})$ is an element of $Q_e$. Before the third demodulation stage, $(\hat{s}'_k{}^{[1]} + \hat{s}'_k{}^{[2]})$ is removed from $Q_e$, and replaced with the set:

$$(\hat{s}'_k{}^{[1]} + \hat{s}'_k{}^{[2]}) \Gamma(Q^{[3]})^M = \{\hat{s}'_k{}^{[1]} + \hat{s}'_k{}^{[2]} + a, \, a \in (Q^{[3]})^M\} \qquad (11)$$

Compared to $(\hat{s}'_k{}^{[1]} + \hat{s}'_k{}^{[2]})$, the elements of $(\hat{s}'_k{}^{[1]} + \hat{s}'_k{}^{[2]}) \Gamma(Q^{[3]})^M$ can be viewed as better approximations to the elements of $Q^M$ in the region of $(\hat{s}'_k{}^{[1]} + \hat{s}'_k{}^{[2]})$.

This construction continues just before the last demodulation stage 154, producing the final $Q_e$, which includes the SLIC solution $\hat{s} = \hat{s}'_k{}^{[1]} + \Lambda + \hat{s}_k{}^{[L]}$ where L corresponds to the last demodulation stage 154. As the constellation size q and number of transmitted symbols M become large, the size of $Q_e$ becomes much smaller than $\cdot q^M$.

The soft value generation unit 160 determines soft bit values for the symbol decisions based on detection metrics computed during demodulation for the points included in the effective constellation constructed incrementally over the sequence of demodulation stages. The effective constellation produced by the final demodulation stage is devoid of one or more points included in the modulation constellation as previously described herein. As such, the soft value generation unit 160 uses the effective constellation constructed incrementally over the sequence of demodulation stages to find effective bit nearest neighbors (EBNNs) closest to the true BNNs, some of which may not be available.

In more detail, the soft value generation unit 160 associates a metric computed by the SLIC process with each element e in the effective constellation $Q_e$. The metric may be a detection metric computed during demodulation for the symbol decisions and/or a detection metric computed during demodulation for symbols corresponding to the EBNNs. In each case, e is of the form $e = (\hat{s}'_k{}^{[1]} + \Lambda + \hat{s}'_k{}^{[i-1]} + a)$ and a belongs to $(Q^{[i]})^M$. In SLIC stage i, a metric is computed for a. The soft generation unit associates that metric with e, which is denoted m(e). In one embodiment, the soft generation unit obtains the metric m(ŝ) for the SLIC solution ŝ from the last demodulation stage 154.

Figure 10:
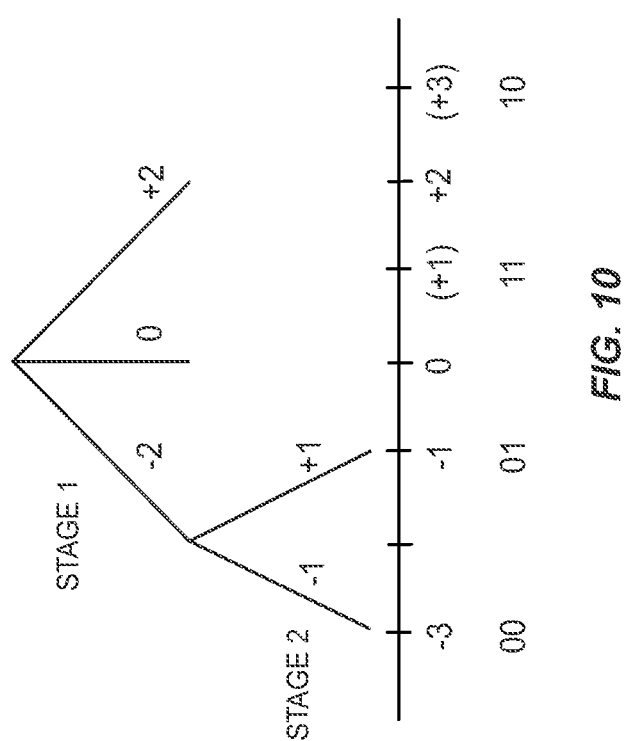
FIG. 10 illustrates a flow diagram of an embodiment of a method for determining a final effective constellation of a SLIC demodulator for use in generating soft bit values.

FIG. 10 illustrates an embodiment of determining the final effective constellation of a SLIC demodulator for use in generating soft bit values for a purely illustrative 4-ASK modulation example. For simplicity, let M=1. Suppose $\hat{s}'^{[1]}_k = -2$, then the final effective constellation is $Q_e = \{-3, -1, 0, +2\}$. The true constellation symbols +1 and +3 are missing as shown in FIG. 10. FIG. 11 shows the bits $b_1 b_0$ mapping into each symbol ŝ and the corresponding bit nearest neighbors (BNNs) $\bar{s}_1$ and $\bar{s}_2$ for each symbol.

The soft value generation unit 160 generates the effective bit nearest neighbors (EBNNs) based on the SLIC solution ŝ. Consider the soft value for bit $b_j$ in the k-th symbol ŝ. The soft value generation unit 160 defines an EBNN vector in $Q_e$, denoted s̃, to be used in the soft value computation. The soft value generation unit 160 uses the Euclidean distance in the transmit domain throughout to compute the EBNNs according to an embodiment. Focusing on the k-th symbol e of element e in $Q_e$, the soft value generation unit 160 performs a two step procedure. In the first step, for each e, the soft value generation unit 160 compares e to the true BNN $\bar{s}_j$ and identifies the values e closest to $\bar{s}_j$. If multiple values e are closest to $\bar{s}'$, then the soft value generation unit 160 chooses as $\tilde{s}_j$ the one among them that is also closest to ŝ. If there is only a single value e closest to $\bar{s}_j$, then the soft value generation unit chooses e as the EBNN $\tilde{s}_j$. Also if $e = \bar{s}_j$, then the soft value generation unit 160 chooses $\bar{s}_j$ as the EBNN $\tilde{s}_j$.

In the second step, the soft value generation unit 160 identifies the elements e in $Q_e$ with $e = \tilde{s}_j$. If multiple elements e have $e = \tilde{s}_j$, then the soft value generation unit 160 chooses as the EBNN s̃ the one among them closest to ŝ. If there is a single element e with $e = \tilde{s}_j$, then the soft value generation unit 160 chooses it as s̃. In particular, if the vector equal to ŝ except for ŝ replaced with $\bar{s}_j$ belongs to $Q_e$, then the soft value generation unit 160 chooses this value as s̃, coinciding with the original BNN vector s̄ for JD. Also, if $\tilde{s}_j \neq \bar{s}_j$, and the vector equal to ŝ except for ŝ replaced with $\tilde{s}_j$ belongs to $Q_e$, then it will be chosen as s̃. As such, each EBNN corresponds to the point included in the effective constellation $Q_e$ produced by the final demodulation stage that is nearest one of the symbol decisions with one of the bits of the symbol decision flipped.

The soft value generation unit 160 then determines the soft value for bit $b_j$ in symbol $s_i$ based on the EBNN vector s̃ as given by:

$$\beta_j = m(\hat{s}) - m(\tilde{s}) \quad (12)$$

By limiting the EBNN vectors to $Q_e$ and using their associated SLIC metrics, no new metric computations are required to compute the soft values.

Returning to the 4-ASK example explained above, FIG. 12 shows 3 different effective constellations $Q_e$ corresponding to 3 possible decisions for $\hat{s}'^{[1]}$ (−2, 0 and +2) in the first demodulation stage and the corresponding EBNNs $\tilde{s}_1$ and $\tilde{s}_2$ determined by the soft value generation unit 160 based on the possible outcomes of ŝ as explained above in detail. The soft value generation unit 160 can pre-compute a table such as the one shown in FIG. 12 so that the EBNNs $\tilde{s}_1, \Lambda \tilde{s}_L$ are predetermined and do not require calculation during operation of the receiver 110. Alternatively, the soft value generation unit 160 performs the two-step process described above to determine the EBNNs. The two-step process may be implemented in hardware, software or some combination of both. All of the computations associated with the two-step process may be performed by the soft value generation unit 160. In another embodiment, the true BNNs are predetermined in advance and known a priori to the soft value generation unit 160. This way, the soft value generation unit 160 need not compute the true BNNs in real time, instead working on-the-fly to determine just the EBNNs.

The soft value generation unit 160 can simplify the search for the EBNN vector s̃ in the second step. For example, multiple elements e in $Q_e$ may have $e = \tilde{s}_j$. Instead of searching for all such elements and identifying the one closest to ŝ, the soft value generation unit 160 simplifies the search $Q_e$ by identifying the first e in $Q_e$ with $e = \tilde{s}_j$ and assigning it to the EBNN vector s̃. The order of the search is not important. Moreover, since the search order is not important, the soft value generation unit 160 can go back to the first step, where $\tilde{s}_j$ is first found. The corresponding element e is then assigned to s̃. The search process ends and the second step is not required. The soft value generation unit 160 then determines the soft bit values based on the EBNN vector in accordance with equation (12) as described above. The soft value generation unit 160 does not attempt to control the symbols of s̃ other than the k-th symbol according to this embodiment, and therefore search precision may be reduced with the advantage of faster performance.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of generating soft bit values for received symbols transmitted based on a modulation constellation, comprising:
   demodulating the received symbols via a sequence of demodulation stages, each demodulation stage producing a symbol decision based on a respective effective constellation, each respective effective constellation used by a non-final one of the demodulation stages including subsets of centroids approximating a region of the modulation constellation, adjacent ones of the subsets having one or more common points so that at least two of the adjacent subsets overlap;
   determining soft bit values for the symbol decisions based on detection metrics computed during demodulation for points included in each respective effective constellation constructed incrementally over the sequence of demodulation stages, the effective constellation produced by a final demodulation stage being devoid of one or more points included in the modulation constellation,
   determining an effective bit nearest neighbor for each bit of each symbol decision, each effective bit nearest neighbor corresponding to the point included in the effective constellation produced by the final demodulation stage that is nearest one of the symbol decisions with one of the bits of the symbol decision flipped;
   wherein determining the soft bit values is based on the effective bit nearest neighbors; and
   identifying one or more points of the effective constellation used by the final demodulation stage that are closest to a true bit nearest neighbor associated with the modulation constellation, each true bit nearest neighbor corresponding to the point included in the modulation constellation that is nearest one of the points in the modulation constellation with a bit flipped.

2. The method of claim 1, comprising determining which point or points included in the effective constellation used by the final demodulation stage are closest to the true bit nearest neighbors and to the symbol decisions to determine the effective bit nearest neighbors.

3. The method of claim 1, comprising:
identifying a point in the effective constellation used by the final demodulation stage that corresponds to one of the effective bit nearest neighbors for each symbol decision;
including the identified constellation point in a vector of effective bit nearest neighbors; and
determining the soft bit values based on the vector of effective bit nearest neighbors.

4. The method of claim 1, comprising:
identifying a point in the effective constellation used by the final demodulation stage that most closely corresponds to one of the effective bit nearest neighbors for each symbol decision;
including the identified constellation point in a vector of effective bit nearest neighbors; and
determining the soft bit values based on the vector of effective bit nearest neighbors.

5. The method of claim 1, comprising determining the soft bit values for the symbol decisions based on detection metrics computed during demodulation for the symbol decisions and detection metrics computed during demodulation for symbols corresponding to the effective bit nearest neighbors.

6. The method of claim 1, comprising:
computing the true bit nearest neighbors based on the points included in the modulation constellation; and
computing the effective bit nearest neighbors based on the points included in the effective constellation used by the final demodulation stage.

7. The method of claim 1, wherein the true bit nearest neighbors are predetermined and the effective bit nearest neighbors are computed based on the points included in the effective constellation used by the final demodulation stage.

8. The method of claim 1, wherein the true bit nearest neighbors and the effective bit nearest neighbors are predetermined.

9. A wireless communication device, comprising a baseband processor including:
a multi-stage demodulator operable to demodulate received symbols transmitted based on a modulation constellation, each demodulation stage of the multi-stage demodulator being operable to produce a symbol decision based on a respective effective constellation, each respective effective constellation used by a non-final one of the demodulation stages including subsets of centroids approximating a region of the modulation constellation, adjacent ones of the subsets having one or more common points so that at least two of the adjacent subsets overlap;
a soft value generation unit operable to determine soft bit values for the symbol decisions based on detection metrics computed during demodulation for the points included in each respective effective constellation constructed incrementally over the sequence of demodulation stages, the effective constellation produced by the final demodulation stage being devoid of one or more points included in the modulation constellation;
wherein the soft value generation unit is operable to determine the soft bit values based on effective bit nearest neighbors determined for the bits of each symbol decision, each effective bit nearest neighbor corresponding to the point included in the effective constellation used by a final demodulation stage that is nearest one of the symbol decisions with one of the bits of the symbol decision flipped; and
wherein the baseband processor is further operable to identify one or more points of the effective constellation used by the final demodulation stage that are closest to a true bit nearest neighbor associated with the modulation constellation, each true bit nearest neighbor corresponding to the point included in the modulation constellation that is nearest one of the points in the modulation constellation with a bit flipped.

10. The wireless communication device of claim 9, wherein the baseband processor is operable to determine which point or points included in the effective constellation used by the final demodulation stage are closest to the true bit nearest neighbors and to the symbol decisions to determine the effective bit nearest neighbors.

11. The wireless communication device of claim 9, wherein the baseband processor is operable to identify a point in the effective constellation used by the final demodulation stage that corresponds to one of the effective bit nearest neighbors for each symbol decision and include the identified constellation point in a vector of effective bit nearest neighbors, and wherein the soft value generation unit is operable to determine the soft bit values based on the vector of effective bit nearest neighbors.

12. The wireless communication device of claim 9, wherein the baseband processor is operable to identify a point in the effective constellation used by the final demodulation stage that most closely corresponds to one of the effective bit nearest neighbors for each symbol decision and include the identified constellation point in a vector of effective bit nearest neighbors, and wherein the soft value generation unit is operable to determine the soft bit values based on the vector of effective bit nearest neighbors.

13. The wireless communication device of claim 9, wherein the soft value generation unit is operable to determine the soft bit values for the symbol decisions based on detection metrics computed during demodulation for the symbol decisions and detection metrics computed during demodulation for symbols corresponding to the effective bit nearest neighbors.

14. The wireless communication device of claim 9, wherein the baseband processor is operable to compute the true bit nearest neighbors based on the points included in the modulation constellation and compute the effective bit nearest neighbors based on the points included in the effective constellation used by the final demodulation stage.

15. The wireless communication device of claim 9, wherein the true bit nearest neighbors are predetermined and the baseband processor is operable to compute the effective bit nearest neighbors based on the points included in the effective constellation used by the final demodulation stage.

16. The wireless communication device of claim 9, wherein the true bit nearest neighbors and the effective bit nearest neighbors are predetermined.

* * * * *

UNITED STATES PATENT AND TRADEMARK OFFICE
CERTIFICATE OF CORRECTION

| | | |
|---|---|---|
| PATENT NO. | : 8,503,580 B2 | Page 1 of 1 |
| APPLICATION NO. | : 12/912927 | |
| DATED | : August 6, 2013 | |
| INVENTOR(S) | : Khayrallah | |

It is certified that error appears in the above-identified patent and that said Letters Patent is hereby corrected as shown below:

In the Specification

In Column 8, Line 66, delete "$Q'[^{N]}$" and insert -- $Q'^{[N]}$ --, therefor.

In Column 9, Line 24, in Equation (9), delete "$Q'^{[1]}=\{-2^{n-i},0,+2^{N-i}\}$" and insert -- $Q'^{[i]}=\{-2^{N-i},0,+2^{N-i}\}$ --, therefor.

In Column 10, Lines 39-40, delete "$(\hat{s}'_k{}^{[1]}+\hat{s}'_k{}^{[2]})\Gamma(Q^{[3]})^M$" and insert -- $(\hat{s}'^{[1]}_k+\hat{s}'^{[2]}_k)\oplus(Q^{[3]})^M$ --, therefor.

Signed and Sealed this
Thirty-first Day of December, 2013

Margaret A. Focarino
*Commissioner for Patents of the United States Patent and Trademark Office*